June 26, 1956 T. MOORHEAD 2,752,012
SLACK ADJUSTER FOR AIR BRAKES
Filed Feb. 13, 1952 2 Sheets-Sheet 1
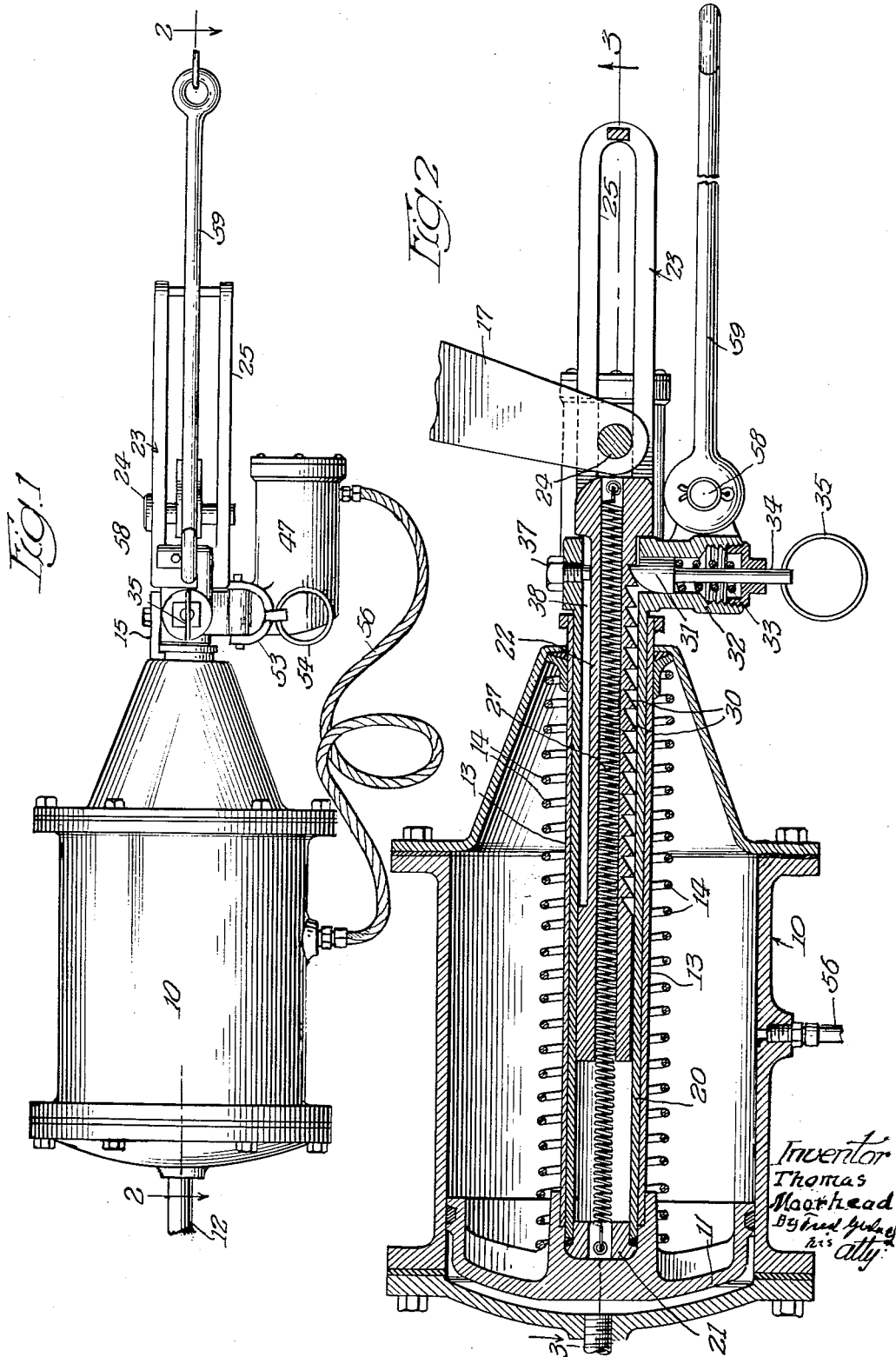
Inventor
Thomas Moorhead June 26, 1956 — T. MOORHEAD — 2,752,012
SLACK ADJUSTER FOR AIR BRAKES
Filed Feb. 13, 1952 — 2 Sheets-Sheet 2
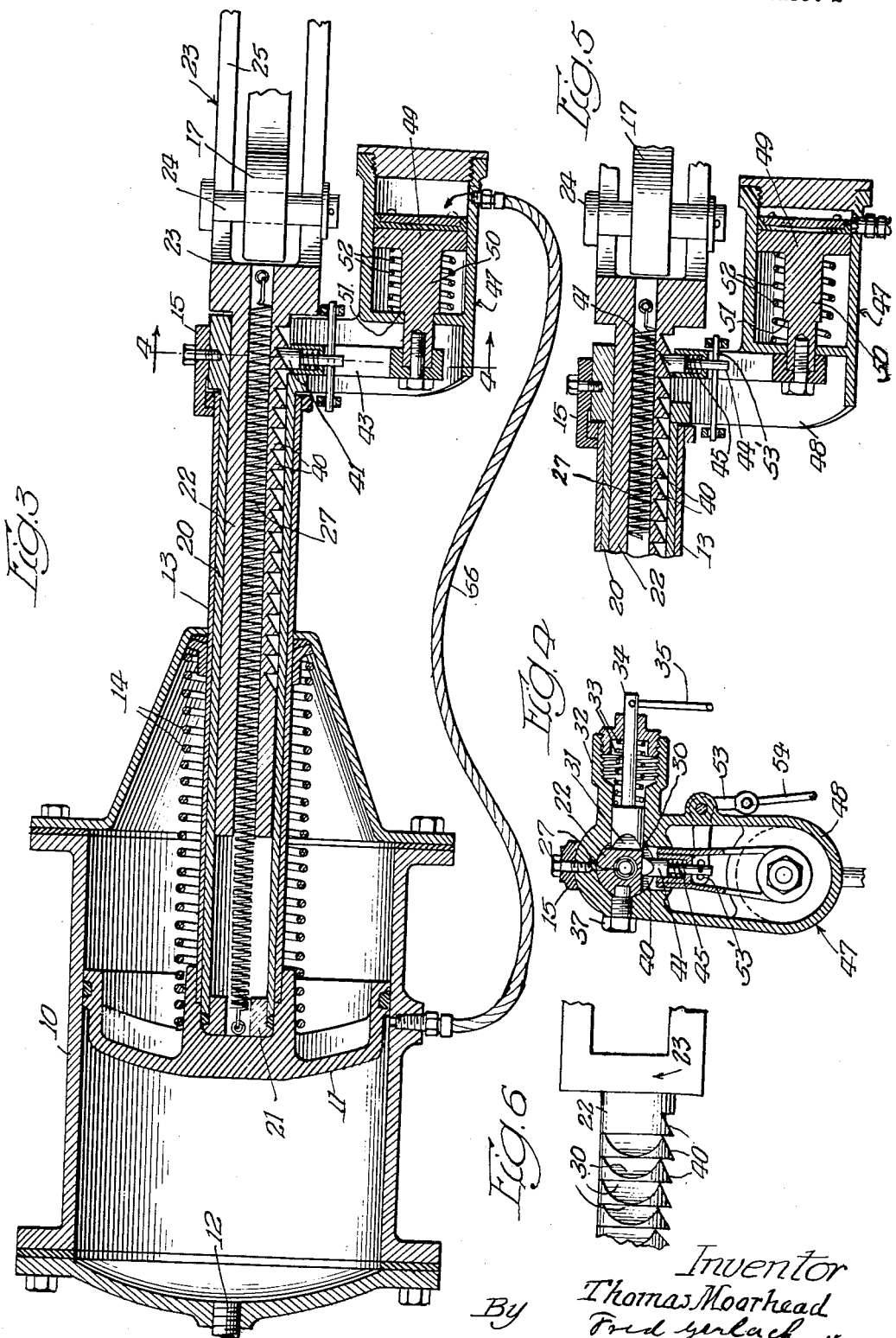
Inventor
Thomas Moorhead
By Fred Gerlach
his Attys United States Patent Office 2,752,012
Patented June 26, 1956

2,752,012

SLACK ADJUSTER FOR AIR BRAKES

Thomas Moorhead, Atchison, Kans., assignor to The Locomotive Finished Material Company, Atchison, Kans.

Application February 13, 1952, Serial No. 271,357

1 Claim. (Cl. 188—198)

The invention relates to devices for automatically adjusting the slack in the rigging for operating the brake shoes or the clearance between the brake shoes and the car wheels.

One object of the invention is to provide an improved slack adjusting device for railway brake systems which will be automatically and pneumatically controlled to compensate for variations in the slack or clearance which results from wear on the brake shoes.

Another object of the invention is to provide an improved slack adjusting device which is efficient in operation and simple in construction.

Other objects of the invention will appear from the detailed description.

The invention consists in the several novel features hereinafter set forth and more particularly defined by claims at the conclusion hereof.

In the drawings:

Fig. 1 is a side elevation of an air brake cylinder equipped with a device embodying the invention;

Fig. 2 is a section taken on line 2—2 of Fig. 1, the brake operating mechanism and slack adjusting device being shown in normal position;

Fig. 3 is a section taken on line 3—3 of Fig. 2, the brake operating mechanism being shown in brake setting position with the pneumatic slack adjusting device set to take up the slack during the succeeding release of the brakes;

Fig. 4 is a section taken on line 4—4 of Fig. 3;

Fig. 5 is a partial section similar to Fig. 3 showing the auxiliary stem moved outwardly one step for taking up slack; and Fig. 6 is a side elevation of a portion of the auxiliary stem.

The invention is exemplified with an air brake cylinder 10, a piston 11 slidable in said cylinder and fixed to a tubular stem 13, a pipe for supplying air under pressure to and exhausting air from, one end of said cylinder, and imparting outstrokes to the piston for operating the brake system, and a spring 14 for retracting the said piston and its stem.

The invention may be used with brake rigging of standard construction for applying and releasing brake shoes, which usually includes a floating lever 17 and suitable connections for operating all of the brake shoes on a truck. The brake shoes are applied by air during the outstroke of piston 11 and when air is exhausted from cylinder 10 the brakes will be released and the piston 11 retracted by spring 14. Since the construction of this rigging is well known in the art, it has not been illustrated or described in detail.

A thrust sleeve 20 is slidable in the piston stem 13, has an abutment or plug 21 secured in its inner end and is operable by the piston 11 to set the brakes. A hollow auxiliary stem 22 is operable by piston 11 and slidable in thrust sleeve 20. Stem 22 is provided at its outer end with a bifurcated yoke 23 which is connected by a pin 24 and slots 25 to the distal end of lever 17. A clip 15 secured to the outer end of sleeve 20 extends around a flange 18 on the outer end of piston stem 13 for retracting sleeve 20. A tension spring 27 in the bore of stem 22 is connected to plug 21 in sleeve 20 and to the outer end of stem 22 for yieldingly pulling said stem inwardly in and retracting it into the sleeve 20. One side of stem 22 is provided with a series of ratchet teeth 30 and a one-way dog 31 is slidable in a housing 32 which projects from one side of said stem, and contains a slidable stem 34 and a spring 33 for urging the dog 31 into yielding engagement with teeth 30. A ring 35 on the outer end of stem 34 is provided for manually disengaging dog 31 from teeth 30 and resetting the stem 22 into its normal position in the thrust sleeve 20. A screw stud 37 in sleeve 20 has its inner end fitted in a groove 38 in stem 22 to retain sleeve 20 and stem against relative rotation and also to limit outward travel of stem 22 in sleeve 20. During each outstroke of piston 11 produced by the delivery of air into cylinder 10, stem 13 and sleeve 20 will be operated to set the brakes, the length of the stroke depending upon the clearance between the brake shoes and the car wheels or the slack in the brake operating connections. This stroke of piston 11 under normal conditions, that is before the brake shoes become worn or the connections have become slack, is usually about 8" in length. As wear of the brake shoes or wheels occurs, or the slack increases, the stroke of the piston 11 proportionately increases before it is arrested by the brake system. This increase in stroke length is utilized to adjust or take up the slack in the brake system by extending and latching the stem 22 outwardly in the sleeve 20 to compensate for the slack resulting from wear, so that a normal stroke of the piston will insure the setting of the brakes.

A pneumatically controlled device for effecting this adjustment comprises: a second series of ratchet teeth 40 on the under side of stem 22 and a one-way dog 41 engaging teeth 40 for latching the stem 22 against retraction in the sleeve 20. Dog 41 is slidably mounted in an arm 43, has a stem 44 and is pressed into sliding engagement with stem 22 by a coil spring 45. An air cylinder 47 is formed on a depending bracket 48 which is integral with sleeve 20. A piston 49 is slidable in cylinder 47 and has a stem 50 which is secured to arm 43 for shifting said arm and the dog 41 which is carried by said arm, step-by-step, relatively to the teeth 40 on stem 22. A spring 52 retracts piston 49 when air is extracted from cylinder 47. A shoulder 51 on piston 49 is adapted to engage the inner end of cylinder 47 for limiting the instroke of piston 49 and the dog 41. A forked bell crank lever 53 which is fulcrumed on frame 48 has a pin and slot connection 53' with the lower end of stem 44 on dog 41 and a ring 54 for rocking said lever to manually disengage said dog from stem 22 and permit retracting of stem 22 in sleeve 20.

A flexible pipe 56 communicatively connects cylinder 10 and the outer end of cylinder 47. Pipe 56 is connected to cylinder 10 for cutting off air to cylinder 47 during the normal stroke, for example, 8" of piston 11, and for admitting air to cylinder 47 when the stroke of piston 11 is increased a predetermined extent, for example, to 8½", as the result of an increase of slack in the brake system. When air is admitted to cylinder 47, it will operate piston 49 to move arm 43 inwardly one step and cause dog 41 to slide over one tooth 40 on stem 20 and latch against the flat face of said tooth, as shown in Fig. 3. When air is exhausted from cylinder 10 to release the brakes it will also be exhausted from cylinder 47 and spring 52 will shift piston 49, stem 50, arm 43 and dog 41 outwardly relatively to sleeve 20, and shift stem 22 to take up the slack. Dog 31 will then latch into the second tooth 30 on the stem 22 and hold said stem against inward movement in sleeve 20. A stud 58 is provided on stem 22 and a link 59 is connected to said stud and a hand brake operating device for manual operation of the brake system.

The operation will be as follows: When the brake connections are in normal condition, air admitted to cylinder 10 will operate piston 11, piston stem 13 and thrust sleeve 20 outwardly. Stem 22 will be shifted outwardly and operate the brake system to apply the brakes. When there is no substantial slack in the brake system, the piston stroke will be about 8 or normal and no air will flow via pipe 56 to cylinder 47, and piston 49 will not move in cylinder 47. Dog 41 will remain engaged with the first tooth 40, and arm 43 will not slide in bracket 48. When there is a predetermined excess or increase of slack in the brake system, the stroke of piston 11 will be increased proportionately, for example to 8½", in applying the brakes, and piston 11 will permit air to pass from cylinder 10 through pipe 56 into cylinder 47. This air will impart an inward stroke to piston 49 and operate arm 43 and dog 41 and said dog will be latched into the second tooth 40 on stem 22 into position as shown in Fig. 3. During this movement of dog 41 and piston 49, stem 22 will be held against inward movement by dog 31 and the tooth 30. Dog 41 will remain latched to the second tooth 40 on stem 22 while the brakes remain applied. When air under pressure is exhausted from cylinder 10 the brakes will be released and the stem 22 and sleeve will be retracted. Air will also be exhausted from cylinder 47 and spring 52 will shift piston 49, arm 43, dog 41 and stem 22 into the position shown in Fig. 5. The stem 22 will then be shifted outwardly relatively to sleeve 20 and take up the slack in the brake system so that the succeeding outstrokes of piston 11 of normal length will apply the brakes. The dog 31 will latch the second tooth 30 on stem 22 and prevent retraction of said stem. Spring 27 holds teeth 30 on stem 22 engaged with dog 31 to prevent retraction of stem 22 in sleeve 20. This adjustment is repeated each time the slack is increased a predetermined distance or sufficiently to increase the outstroke of the piston 11 about ½ inch, for the operation of piston 49 to latch into the next tooth 40 on stem 22, and for cumulative adjustment of the stem 22 in sleeve 20 as the slack increases.

When the brake shoes have worn to a point requiring replacement, the rings 35 and 54 are manually and simultaneously operated to disengage dog 31 from sleeve 20 and dog 41 from stem 22. Stem 22 will then be retracted in said sleeve by spring 27 into its normal position so that dog 31 will engage the first tooth 30 and dog 41 will engage the first tooth 40 on stem 22.

The invention is not to be understood as restricted to the details set forth, since these may be modified within the scope of the appended claims without departing from the spirit and scope of the invention.

Having thus described the invention what I claim as new and desire to secure by Letters Patent is:

In an air brake system for railway cars, the combination with an air brake cylinder, a piston having a tubular stem with a brake-operating lever, a sleeve slidable in the cylinder, stem slidably mounted in said in the tubular piston stem, stem slidably mounted in said sleeve for shifting said lever, and a clip connecting the outer end of the piston stem and the sleeve, for shifting the sleeve with the piston, the piston, sleeve and stem in the sleeve being operable to increase the stroke of the lever upon an increase of slack in the brake system; of slack adjusting mechanism comprising; a series of ratchet teeth on the stem in the sleeve and a spring-pressed dog mounted on the sleeve and for latching the stem in the sleeve against inward movement, a second series of ratchet teeth on the stem, a second spring-pressed dog having latching engagement with the second series of teeth, an air cylinder mounted on the sleeve, a piston slidable in the cylinder on the sleeve, an arm fixed to the last named piston on which the second dog is slidably mounted, for latching engagement with the second series of ratchet teeth, means for delivering air from the brake cylinder to the cylinder on the sleeve upon a predetermined increase of the stroke of the piston in the brake cylinder, for slidably shifting the second dog to over-run a tooth on said second series of teeth, and a spring for shifting the second dog to shift the stem outwardly when air is released from the cylinder on the sleeve.

References Cited in the file of this patent

UNITED STATES PATENTS

| | | |
|---|---|---|
| 533,485 | McKee | Feb. 5, 1895 |
| 696,523 | Wahlert | Apr. 1, 1902 |
| 704,508 | Burgess | July 15, 1902 |
| 914,024 | Dodson | Mar. 2, 1909 |
| 1,738,395 | Sauvage | Dec. 3, 1929 |
| 1,749,018 | Campbell | Mar. 4, 1930 |
| 2,648,408 | Martin | Aug. 11, 1953 |